May 3, 1966  H. E. STOCKMAN  3,249,944
ELECTROMAGNETIC TRANSDUCTION UTILIZING RADIANT ENERGY
Filed Aug. 16, 1963

INVENTOR.
HARRY E. STOCKMAN
BY
Ezekiel Wolf, Wolf & Greenfield
ATTORNEYS

United States Patent Office 3,249,944
Patented May 3, 1966

3,249,944
ELECTROMAGNETIC TRANSDUCTION
UTILIZING RADIANT ENERGY
Harry E. Stockman, 72 Gray St., Arlington, Mass.
Filed Aug. 16, 1963, Ser. No. 302,522
10 Claims. (Cl. 343—118)

The present invention relates in general to electromechanical transduction and more particularly concerns novel apparatus for converting incident radiant energy into mechanical energy. An embodiment of the invention functioning as a motor converts the incident radiant energy into mechanical energy without using contacts or brushes of any kind.

It is an important object of this invention to convert incident radiant energy into mechanical energy.

It is another object of the invention to achieve the preceding object in a motor structure free from contacts or brushes of any kind.

It is still another object of the invention to achieve the preceding objects with a structure that insures self-starting conversion of incident radiant energy into mechanical energy upon receipt of radiant energy.

It is still a further object of the invention to employ the principles of this invention for modulating a radar return to facilitate radar detection and identification of the object being interrogated.

It is still a further object of the invention to achieve the preceding objects wherein the duration and speed of rotation may be utilized to characterize the target having the structure according to the invention which returns the energy.

According to the invention, radiant energy transducing means converts incident high frequency radiant energy into corresponding high frequency electrical signals. Detecting means convert the high frequency electrical signals into unipolar electrical energy, such as a variational direct current. There is a source of a first magnetic field, and means responsive to the unipolar electrical energy establish a second magnetic field. Means support the latter means and the first magnetic field source in relatively movable adjacent relationship with the relative displacement therebetween being related to the strength and orientation of the first and second magnetic fields.

In a specific form of the invention the detecting means comprise receiving means including a tuned circuit resonant at substantially the same frequency where the radiant energy transducing means effects conversion of incident radiant energy into corresponding high frequency electrical signals with relatively high efficiency, the radiant energy transducing means preferably being characterized by a directional radiation pattern. Typically, means maintain the radiant energy transducing means and the receiving means in fixed relationship. In accordance with a specific form of the invention shielding means selectively control the amount of radiant energy incident upon the radiant energy transducing means, and means are provided for maintaining the shielding means and the first magnetic field source in fixed relationship.

With the invention functioning as a motor in a specific form, the radiant energy transducing means may be a loop antenna or dipole antenna oriented in a plane tilted 45 degrees with respect to the motor axis of rotation. The assembly is oriented so that the H vector of the incident radiant energy makes an angle of 45 degrees with the motor axis if the antenna is a loop antenna, or the E vector of the incident radiant energy makes an angle of 45 degrees with the armature axis if the antenna is a dipole.

Numerous other features, objects and advantages of the invention will become apparent from the following specification when read in connection with the accompanying drawing in which.

Figure 1:
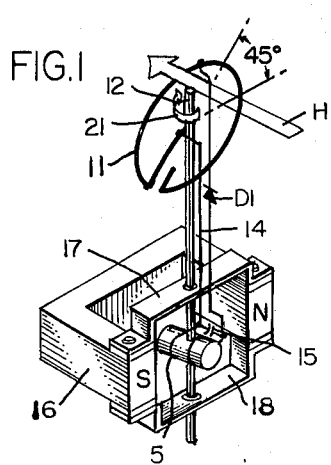
FIG. 1 shows an embodiment of the invention using a loop antenna.

With reference now to the drawing and more particularly FIG. 1 thereof, there is shown an embodiment of the invention comprising a loop antenna 11 attached to the armature shaft 12 and oriented with its plane at an angle of 45 degrees with respect to the axis of the shaft. The magnetic field vector H of the incident radiant energy is also tilted 45 degrees with respect to the rotor shaft 12. The effective inductance and effective capacitance of the loop antenna 11 resonate the loop to the frequency of the incoming radiation.

A diode rectifier D1 couples the loop 11 to an armature winding 5 mounted on the rotor shaft 12 via an inductor form made of non-ferrous material. The armature winding 5, comprises many turns of fine wire. A conductor 14 is in series with the armature winding 5 and loop 11 and a capacitor 15 bypasses radio frequency signals around armature winding 5. The loop antenna 11, the rectifier diode D1, the armature winding 5, the bypass capacitor 15 and the rotor shaft 12 comprise the rotor of the motor.

The stator comprises a permanent magnet 16, an upper rotor support bracket 17 and a lower rotor support bracket 18, both these brackets being made of material of high magnetic reluctance. Armature winding 5 is arranged so that rotor shaft 12 is midway between the north pole N and the south pole S.

Operation of this motor is as follows: With loop antenna 11 in the postion shown, the plane of loop 11 is substantially perpendicular to the H vector of the incident radiant energy to induce a maximum current in loop 11. This current is rectified by diode D1 to produce a variational direct current through armature winding 5 establishing a magnetic field that is substantially perpendicular to the magnetic field established by the permanent magnet. Accordingly, the torque exerted on the armature winding 5 as a result of the orthogonal orientation between the permanent magnet field and the magnetic field produced by the armature winding is a maximum so that the rotor rotates in the direction of arrow 21. When the rotor completes a half revolution of 180 degrees, the plane of the loop antenna 11 is parallel to the magnetic field vector H so that no radio frequency energy is induced in loop 11. Thus, the angular momentum of the rotor is not opposed by a torque in the opposite direction and the rotor continues to move into a position where a component of the vector H is perpendicular to the plane of loop 11 to again induce radio frequency currents which are rectified by diode D1 to produce a magnetic field establishing current that in turn establishes a magnetic field that coacts with a magnetic field established by the stator permanent magnet 16 to sustain the rotation in the indicated direction. Thus, automatic commutation effectively results without brushes and without contacts.

Figure 2:
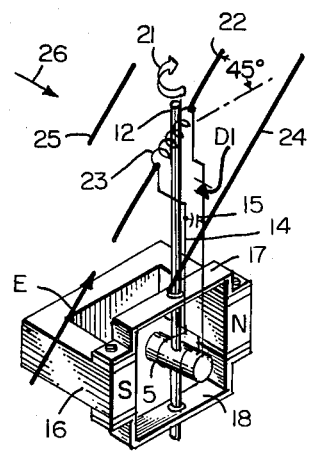
FIG. 2 shows an embodiment of the invention using a dipole antenna.

Referring to FIG. 2, there is shown another embodiment of the invention employing a dipole antenna 22 titled at an angle of 45 degrees with respect to the axis of the rotor shaft 12. The electric field vector E of incident radiant energy is also titled 45 degrees with respect to the axis of rotor shaft 12. The length of dipole antenna 22 and the inductance of loading coil 23 are arranged to resonate the antenna system to the frequency of the incoming radiation. With the motor oriented as shown, the incident radiation induces an electromotive force in dipole 22 to produce a corresponding radio frequency current that is rectified by diode D1 to produce a variational direct current that is applied to armature winding 5 to establish a magnetic field oriented at right angles to the one between the north pole and the south pole of permanent magnet 16 to cause the rotor to rotate in the direction of arrow 21. When shaft 12 has rotated 180 degrees, dipole 22 will be perpendicular to the electric field vector E and at that time the received radio frequency power will be a minimum. The angular momentum associated with the rotor will keep it rotating so that a component of the electric field vector E parallel to dipole 22 will again induce radio frequency currents that are rectified by diode D1 to produce a variational direct current in armature winding 5 and thus produce a magnetic field which coacts with the permanent magnetic field to sustain rotation.

Parasitic reflector and director elements 24 and 25 may be added to coact with dipole 22 and sharpen its direction of receptivity pattern to facilitate automatic commutation while allowing the dipole antenna system thus formed to have its elements at right angles to the rotor shaft 12. Thus, with armature winding 5 oriented as shown, the dipole with reflector and director elements would be oriented with maximum directivity along the line indicated by arrow 26. Then with the shaft rotated 180 degrees, a minimum of energy incident from the direction indicated by arrow 26 would be received by the antenna system.

Figure 3:
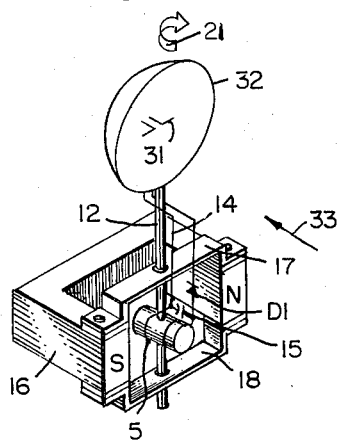
FIG. 3 shows an embodiment of the invention using a dipole antenna situated in a parabolic reflector.

Referring to FIG. 3, there is shown an embodiment of the invention similar to that described above with the exception that a dipole 31 situated in a parabolic reflector 32 effects the directivity pattern with maximum and minimum receptivity separated by 180 degrees. Thus, with energy incident from the direction indicated by arrow 33, maximum direct current is produced in armature winding 5 to develop a torque on the rotor which rotates the antenna assembly until the back of the reflector 32 blocks energy from the direction 33 so that minimum receptivity occurs at this time. The rotor angular momentum carries the antenna assembly around so that it once again picks up energy from the direction 33 to effect continuous rotation.

Self-starting may be established by arranging a number of like antenna systems each with an associated armature winding of the type described on a common shaft but angularly displaced about the shaft axis with all armature windings arranged to cut the magnetic field established by permanent magnet 16 upon rotation of the shaft.

Figure 4:
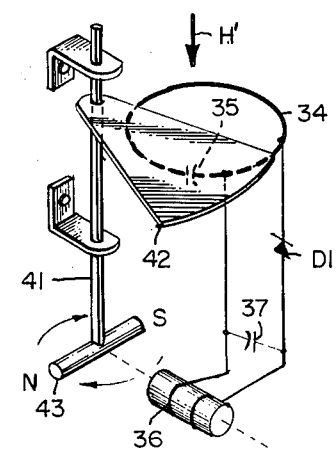
FIG. 4 shows an embodiment of the invention using a fixed loop antenna with energy intermittently shielded as a conducting vane attached to the rotor shaft passes between the loop and the radiant energy source.

Referring to FIG. 4, there is shown still another embodiment of the invention employing a stationary loop antenna 34 which coacts with capacitor 35 to resonate at the frequency of incoming radiation represented by the magnetic field vector H'. Diode D1 rectifies the received energy and applies it to stationary field winding 36 shunted by bypass capacitor 37. The rotor comprises shaft 41 supporting a conducting vane 42 at the top and a bar magnet 43 at the bottom. The angular displacement between vane 42 and bar magnet 43 is so arranged that in one position of bar magnet 43 having its axis perpendicular to that of stator winding 36, vane 42 shields loop 34 from incident radiation. In the other position of bar magnet 43 with its axis perpendicular to that of stator winding 36, vane 42 leaves loop 34 completely exposed to receive the maximum amount of incident radiant energy and thus maximize the torque exerted by bar magnet 43 in response to the magnetic field established by stator winding 36. Vane 42 not only functions to shield loop 34 from radiation, but it also functions to detune the loop as the vane approaches (parametric action), thus establishing a high ratio of maximum receptivity to minimum receptivity as a function of rotor angle.

Figure 5:
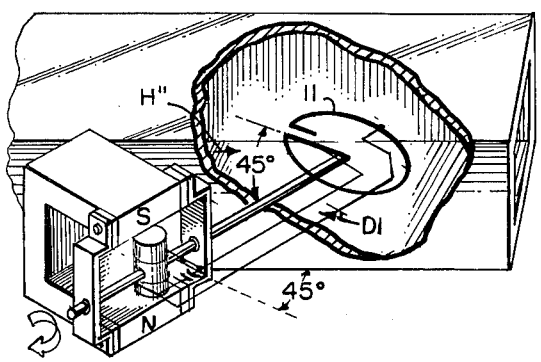
FIG. 5 is an embodiment of the invention responsive to energy transmitted through a waveguide.

Referring to FIG. 5, there is shown still another embodiment of the invention in which the motor of FIG. 1 is arranged with the loop antenna inside a waveguide or cavity propagating a wave having the magnetic field vector orientation indicated by the vector H''.

The invention is especially advantageous in connection with facilitating target identification when targets being interrogated by a radar system are equipped with motors according to the invention having antennas tuned to the frequency of the high frequency energy radiated by the radar system. The incident radar energy will cause rotation of the rotor. And this in turn will cause modulation of energy returned from the target antenna system, observable, in one alternative, as a blinking spot on a conventional radar PPI.

There has been described a novel electromechanical transducing system responsive to radiant energy. It is evident that those skilled in the art may now make numerous modifications of, departures from and use of the specific embodiments described herein without departing from the inventive concepts.

Consequently, the invention is to be construed as limited only by the spirit and scope of the appended claims.

What is claimed is:

1. Electromechanical transducing apparatus responsive to radiant energy comprising,
    radiant energy transducing means for converting incident high frequency radiant energy into corresponding high frequency electrical signals,
    detecting means coupled to said radiant energy transducing means for converting said high frequency electrical signals into unipolar electrical energy,
    a source of a first magnetic field,
    means responsive to said unipolar electrical energy for establishing a second magnetic field,
    and means for supporting the latter means and said first magnetic field source in relatively movable adjacent relationship with the relative displacement therebetween being related to the strength and orientation of said first and second magnetic fields said means for supporting including means for establishing interaction between said first magnetic field and said second magnetic field to produce relative movement between said latter means and said first magnetic field source.

2. Electromechanical transducing apparatus in accordance with claim 1 wherein said detecting means comprises a tuned circuit resonant at substantially the same frequency where said radiant energy transducing means effects conversion of incident radiant energy into corresponding high frequency electrical signals with high efficiency.

3. Electromechanical transducing apparatus in accordance with claim 2 wherein said radiant energy transducing means is characterized by a directional radiation pattern.

4. Electromechanical transducing apparatus in accordance with claim 2 and further comprising,
    means for maintaining said radiant energy transducing means and said detecting means in fixed relationship.

5. Electromechanical transducing apparatus in accordance with claim 4 and further comprising,
    shielding means for selectively controlling the amount of radiant energy incident upon said radiant energy transducing means,
    and means for maintaining said shielding means and said first magnetic field source in fixed relation.

6. Electromechanical transducing apparatus in accordance with claim 1 wherein said means for supporting supports said latter means and said first magnetic field source relatively rotatable about an axis, and said transducing means comprises antenna means defining a plane forming an angle of substantially 45 degrees with respect to said axis.

7. Electromechanical transducing apparatus in accordance with claim 6 wherein said antenna means comprises a loop whose perimeter defines said plane.

8. Electromechanical transducing apparatus in accordance with claim 6 wherein said antenna means comprises a dipole whose elements define said plane.

9. Electromechanical transducing apparatus in accordance with claim 1 wherein said transducing means comprises a directional antenna.

10. Electromechanical transducing apparatus in accordance with claim 1 and further comprising, waveguide means embracing said transducing means.

References Cited by the Examiner

UNITED STATES PATENTS

| | | | |
|---|---|---|---|
| 1,844,859 | 2/1932 | Levy | 343—118 |
| 2,942,117 | 6/1960 | Maxwell et al. | 343—118 |
| 3,003,148 | 10/1961 | Tanaka et al. | 343—118 |
| 3,172,106 | 3/1965 | Zaleski | 343—6.8 |

CHESTER L. JUSTUS, *Primary Examiner.*

E. T. CHUNG, *Assistant Examiner.*